March 16, 1965  E. J. DOPERALSKI  3,173,697
PISTON ASSEMBLY
Filed Dec. 7, 1961  2 Sheets-Sheet 1
FIG. I.
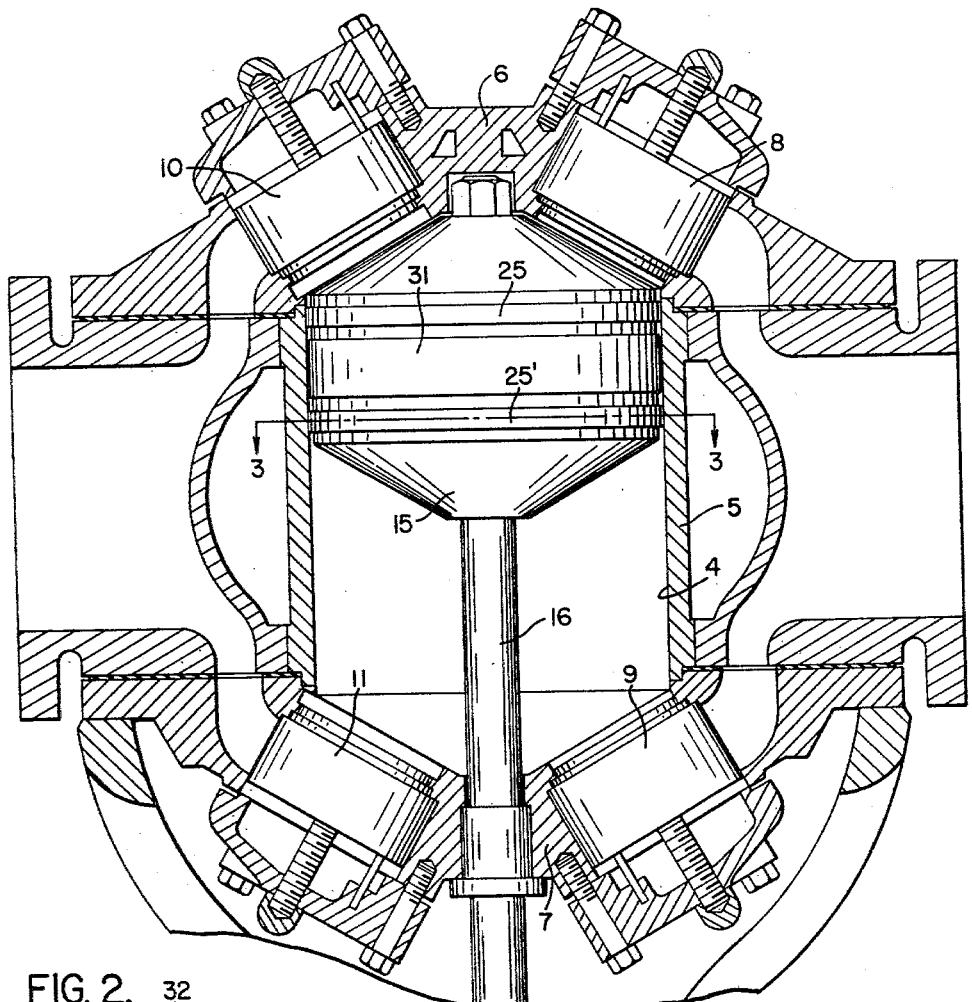
FIG. 2.
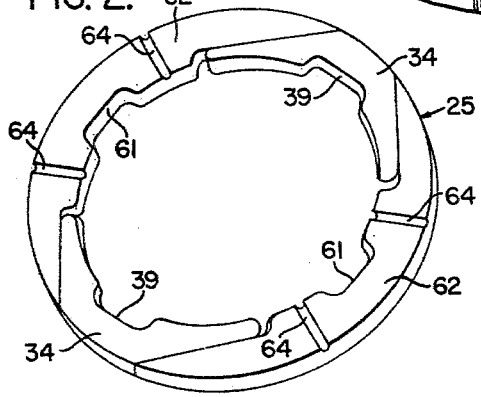
INVENTOR:
EUGENE J. DOPERALSKI
BY
Joseph Januszkiewicz
ATTORNEY March 16, 1965   E. J. DOPERALSKI   3,173,697
PISTON ASSEMBLY
Filed Dec. 7, 1961   2 Sheets-Sheet 2

INVENTOR:
EUGENE J. DOPERALSKI
BY
Joseph Januszkiewicz
ATTORNEY

United States Patent Office 3,173,697
Patented Mar. 16, 1965

3,173,697
PISTON ASSEMBLY
Eugene J. Doperalski, Michigan City, Ind., assignor to Joy Manufacturing Company, Pittsburgh, Pa., a corporation of Pennsylvania
Filed Dec. 7, 1961, Ser. No. 157,778
3 Claims. (Cl. 277—148)

This invention relates to a piston ring assembly, and more particularly to a piston ring assembly which is slidably mounted in a cylinder, wherein the ring assembly has effective means for sealing the piston rings against the cylinder walls during the compression stroke of the piston.

When a piston reciprocates in a cylinder, the piston ring members must maintain firm engagement with the walls of the cylinder to insure effective sealing. Upon reciprocation of the piston therein, the fluid in the chamber will be compressed and released through discharge valves provided for that purpose. Piston ring members are fitted into the ring grooves of the piston with a degree of side clearance or axial clearance to allow the piston ring members to move freely inwardly and outwardly. The side clearance also provides a limited passageway for the fluid to act on the piston ring member such that when the piston ring members are in firm engagement with the walls of the cylinder, the resulting pressurized gas on the compression stroke acts on the surface of the piston ring member toward the compressed gas, which for descriptive purposes is called the top surface, causing the piston ring member to seat its bottom surface on the piston ring groove surface. In addition the pressurized fluid will tend to flow through the clearance between the top surface of the piston ring member and the piston ring groove surface into the clearance between the inner periphery of the piston ring member and the piston ring groove periphery, thus acting on the inner peripheral surface of the piston ring member tending to urge the piston ring member outward in a radial direction against the cylinder wall. It is important that the piston ring members originally be in firm contact with the cylinder wall to cause the aforementioned action.

The general purpose of this invention is to provide a piston ring assembly which employs a novel constructed piston ring which effectively seals the piston ring against the cylinder wall maintaining the pressure in the compression end of the cylinder yet releasing the pressure upon the return stroke of the piston thereby minimizing piston ring wear. In addition the piston rings are provided with means for taking up the wear of the piston rings to compensate for wear thereon thereby maintaining the effective seal throughout the life of the piston ring.

An object of the present invention is to provide a piston with carbon rings for effectively sealing the compressed gases during the compression stroke of the piston while relieving the pressure on the rings during the return stroke.

An object of the present invention is to provide a piston with piston rings for effectively sealing the compressed gases during the compression stroke of the piston while relieving the pressure on the rings during the return stroke.

An object of the present invention is to provide a non-lubricated piston with carbon rings for effectively sealing the compressed gases during the compression stroke of the piston.

Another object of this invention is to provide a piston with piston rings which effectively seal the piston in its compression stroke while relieving pressure wear during the suction stroke.

Another object of this invention is to provide a non-lubricated piston with carbon rings which effectively seal a double acting piston in its respective compression strokes while relieving wear during the suction stroke.

A further object of this invention is to provide pressure relief grooves on piston rings which effectively seal the piston rings during the compression stroke and relieve the pressure behind the rings during the return stroke resulting in a greater sealing contact when pressure is needed and reducing the sealing contact pressure when not needed thereby reducing wear.

A further object of this invention is to provide pressure relief grooves on piston rings so that they effectively seal the piston rings during the compression stroke and relieve the pressure behind the rings during the suction stroke in either a single acting or a double acting compressor.

These and other objects of the invention will become more apparent upon consideration of the following detailed description of a preferred embodiment thereof, when taken in conjunction with the following drawings, in which:

FIG. 1 is a cross sectional view of a compressor cylinder showing the piston in full and the connecting rod thereof;

FIG. 2 is a perspective view of the improved piston ring showing the pressure relief grooves;

Figure 3:
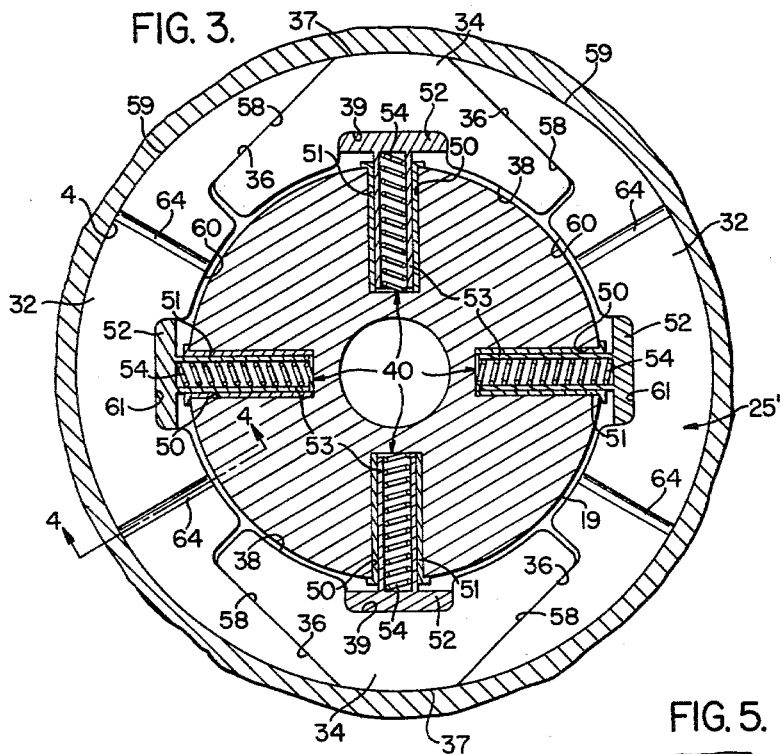
FIG. 3 is a cross sectional view of the piston ring assembly as shown in FIG. 1 taken substantially along the line 3—3 thereof showing a carbon ring made up of four circular segments.

In this illustrative embodiment of the invention, as shown in the drawings, the improved sealing ring construction is associated with a double acting compressor which comprises a cylinder 5 having an elongated bore 4 closed by an upper end head 6 and a lower end head 7, and containing a reciprocable piston 15. The piston 15 has a piston rod 16 which extends outwardly from the lower head 7 through suitable packing and connected to a suitable cross head which cross head is connected to crank shaft pin which is rotated in a manner well known in the art to provide a reciprocating motion for the piston 15. Fluid is supplied alternatively to the upper end portion and the lower end cylinder portion of cylinder 5 through suitable conduits and inlet valves 8 and 9 respectively. The fluid which is compressed in cylinder 5 is discharged through suitable discharge valves 10 and 11, alternatively to a suitable receiver or to the place of application as the case may be (not shown) in a manner well known and understood in the art.

As shown, piston 15 is provided with spaced circumferentially extending upper and lower annular grooves 18 and 19 respectively. Each annular groove 18 and 19 receives a segmental packing ring 25, conventionally referred to as a piston ring. Piston 15 is provided with an enlarged circumferentially extending annular groove 20 intermediate the respective piston grooves 18 and 19, in which groove 20 and annular bull ring 31 is located.

Upper annular groove 18 has a top annular surface 21 and an oppositely disposed bottom annular surface 22 parallel to top surface 21 with the inner bottom surface of groove 18 terminating into a cylindrical circumferentially disposed surface 23. Similarly lower piston groove 19 has a top annular surface 27 and a complementary and oppositely disposed parallel bottom annular surface 28 with a complimentary cylindrical surface 29. Located in the respective piston grooves 18 and 19 are segmental piston rings 25 and 25' wherein only one piston ring 25 will be described, wherein all piston rings are similarly constructed. Each segmental piston ring 25 comprises four pieces wherein the composite piston rings outer periphery is a circular surface engaging the inner walls of the cylinder 5. The composite inner sides of the piston ring 5 is also curved and parallel to the outer periphery of the piston ring. The segments in each ring 25 are of the same width or thickness having flat radial coplanar sides lying respectively in common radial planes.

Each piston groove 18 and 19 has four equally circumferentially spaced recesses 50 lying 90° apart with respect to each other with the axes of the recesses 50 lying in a common plane which plane is normal to the longitudinal axis of the piston 15. Each segmental piston ring 25 has a pair of diametrically opposed arcuate segments 32 and a pair of intermediate diametrically opposed wedge segments designated as 34. Each wedge segment 34 has outwardly converging inclined side wedging surfaces 36, a forwardly disposed arcuate surface 37 and a rearwardly disposed arcuate surface 38 with its intermediate portion recessed as at 39, which recessed portion 39 is aligned with recess 50 in the piston 15 for a purpose to be described. A T-shaped plunger 52 having a hollow open end stem portion 53 is slidably received by the tubular sleeve 51 with a closed end helical spring 54 suitably guided in the stem portion 53 of plunger 52 such that the bottom end portion of the helical spring 54 is suitably seated on the bottom of recess 50 and the other end of spring 54 engaging the transverse portion of the T-shaped plunger 52 which transverse portion engages the intermediate recess portion 39 of the wedge segment 34 for biasing the wedge segment 34 radially outwardly into wedging engagement with the arcuate segments 32 in a manner well understood in the art and clearly apparent from FIG. 3. The T-shaped plunger 52, and the spring 54 in cooperation with the plunger 50 comprises a biasing means 40.

Each arcuate segment 32 has an outwardly diverging inclined side surface 58 engaging the converging inclined side surfaces 36 of wedge segment 34, a forwardly disposed arcuate surface 59 occupying approximately 160° of the periphery of the piston ring 25, and a rearwardly disposed arcuate surface 60 generally concentrically parallel to the outer arcuate peripheral surface 59. Other ring types and configurations are equally applicable and within the scope of the invention. The rearwardly disposed arcuate surface 60 is recessed intermediate its end portions as at 61 in a similar manner as the recess 39 on wedging segment 34 and for the same general purpose.

Each arcuate segment 32 has a top or upper planar surface 62 and a bottom or lower planar surface 63 which surfaces are parallel to each other. The upper portion of each arcuate segment 32 has a pair of spaced pressure relief grooves 64 which are radially disposed thereon, extending into the upper planar surface 62 of the segment 32. The two arcuate segments 32 and the pair of wedging segments 34 cooperate to form a complete piston ring 25 with gapless joints, with the respective upper surfaces of the piston ring 25 and the bottom surfaces of the piston ring 25 respectively engaging the upper and bottom surfaces of the groove 18 with the necessary manufacturing clearances to provide free sliding movement therebetween, with the respective biasing means 40 biasing the piston ring segments into engagement with the wall portions of the cylinder 5 to expand the ring into tight sealing contact with the walls of the cylinder bore. As wear occurs, the ring continues to expand to maintain an adequate seal, in an obvious manner.

The lower piston groove 19 of the piston 15 receives a segmental piston ring 25' constructed in the same manner as segmental piston ring 25 described above with the reference numerals primed but referring to like elements. Segmental piston ring 25' is located in the annular groove 19 with the pressure relief groove 64' in the lowermost position such that the bottom annular surface of the groove 19 in cooperation with the pressure relief groove 64' defines a passageway from the outer periphery of the clearance space provided by the cylinder wall of cylinder 5 and the outer periphery of piston 15 to the clearance space provided by the cylindrical surface of the groove 19 and the rearwardly disposed arcuate surfaces of the segmental piston ring 25' for a purpose to be described.

Figure 4:
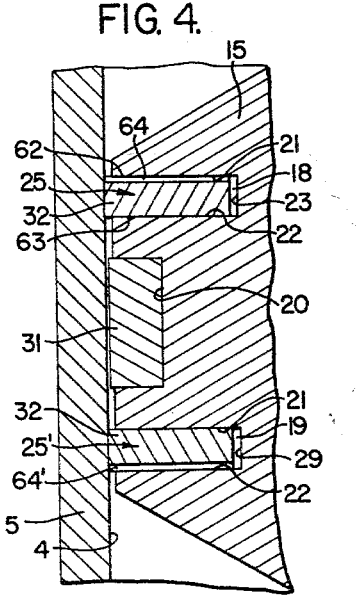
FIG. 4 is a fragmentary sectional view, taken on line 4—4 of FIG. 3 showing a portion of the piston and piston ring assembly with the piston rings in contact with the cylinder walls thereof.

Since piston 15 is double acting, on its forward upward movement as viewed in FIG. 4 piston 15 compresses gas in the upper portion of cylinder 5 and with the piston ring 25 in groove 18 having its outer periphery in contact with the cylinder walls due to the biasing action of the biasing means 40, the compressed gas acting uniformly on the upper surface of the piston ring 25 will seat the piston ring 25 on the bottom annular surface 22 in upper groove 18, such that the bottom planar surface of piston ring 25 effectively seals the passage of gas between the bottom planar surface of piston ring 25 and the bottom annular surface 22 of groove 18. The compressed gas passes through the pressure relief grooves 64 on the upper planar surfaces into the clearance space provided between the outer cylindrical wall surface 23 of groove 18 and the inner peripheral surface 60 of the piston ring 25 to exert a resulting pressure on the inner peripheral surface of the piston ring 25, which peripheral surface is the sum total of the pairs of rearwardly disposed arcuate surfaces 60 of arcuate segment 32 and the pair of rearwardly disposed arcuate surfaces 38 of wedging segments 34. This resulting pressure on the inner peripheral surfaces of ring 25 maintains an effective contacting of the piston ring 25 against the cylinder wall of the cylinder 5 providing the desired gas tight seal during the upward compression stroke of the piston 15 until the respective discharge valve can relieve the pressure in the upper portion of cylinder 5.

During such upward compression stroke the lower piston ring 25' in groove 19 is substantially relieved of any pressure (as explained below) and the outer peripheral surface of piston ring 25, which is the sum total of the pair of forwardly disposed arcuate surfaces 59 of arcuate segment 32 and the pair of forwardly disposed arcuate surfaces 37 of wedging segments 34, maintains, a sliding contact with the cylinder wall of cylinder 5 without any substantial wear, since any gas in the clearance space between the rearwardly disposed cylindrical surface of groove 19 and the rearwardly disposed arcuate surfaces of arcuate segment 32 and wedging segment 34 would be dissipated by a pressure relief groove 64' to the lower portion of the cylinder chamber wherein the pressure has collapsed and is substantially relieved of pressure. Upward, downwardly are relative terms and are applied herein with respect to the figures as disclosed for convenience of explanation and it is understood that the scope of the invention is not to be limited thereby but may well be practiced with the directions in other relationships.

A similar action takes place during the downward movement of piston 15 on the return compression stroke in the double acting arrangement wherein the lowermost piston ring 25' has its pressure relief groove 64' facing downwardly which is the direction in which compression takes place such that the compressed gas acts uniformly on the bottom planar surface of piston ring 25' in lower groove 19 which will cause the piston ring 25' to seat on the top annular surface 21 in lower groove 19, such that top planar surface of piston ring 25' effectively seals the passage of gas between the top planar surface and the top annular surface 21 of groove 19. The compressed gas enters pressure relief groove 64' and is directed to the clearance space provided between the outer cylindrical wall surface 29 of groove 19 in piston 15 and the inner peripheral surfaces of piston ring 25' to exert a resulting pressure on the inner peripheral surface of the piston ring 25', which is the sum total of a pair of arcuate surfaces of arcuate segment 32 and the rearwardly disposed arcuate surfaces 38 of wedging segment 34, to maintain an effective seal during the downward compression stroke. The upper piston ring 25 during such downward compression stroke has its pressure relief grooves 64 directly connecting the upper portion of cylinder 5 wherein pressure is collapsed with the clearance space provided between the inner peripheral surface of piston ring 25 and the bottom surface of piston ring groove 18 to relieve any accumulation of gas pressure in the clearance space so that it is relieved of any substantial pressure. Only the biasing means 40 maintains an outward force on the piston ring 25 so that there is a minimum sliding contact of the outer peripheral surface of piston ring 25 against the inner cylindrical wall of cylinder 5.

Figure 5:
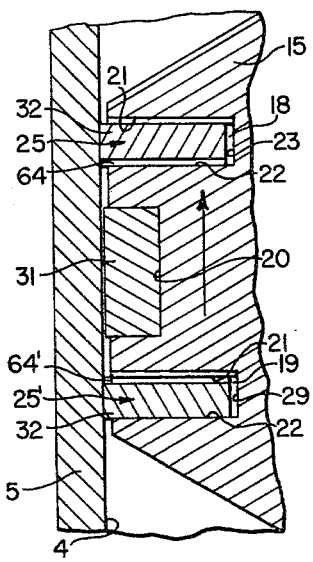
FIG. 5 is a modification of the view shown in FIG. 4 wherein the piston rings with their respective pressure relief grooves are shown in different coordinated relationship.

A modification of the arrangement of piston rings in the respective grooves 18 and 19 is shown in FIG. 5 wherein upper piston ring 25 located in piston groove 18 is reversed such that the pressure relief groove 64 is in abutting contact with the bottom annular surface 22 of piston ring groove 18. In a similar manner, compression piston ring 25' is similarly reversed such that the pressure relief groove 64' is substantially in contact with the upper annular surface 21 of piston groove 19 (whereas in the original embodiment pressure relief groove 64' was facing downwardly) forming a passageway between the bottom cylindrical surface 29 of piston groove 19 with the clearance space provided between the outer cylindrical wall of piston 15 and the inner wall of cylinder 5.

The modification shown in FIG. 5 operates in a similar manner as that discussed in the original embodiment wherein only one piston ring effectively provides a gas tight seal during the compression stroke whereas the other piston ring is effectively relieved of pressure so that there is only one piston ring primarily sealing during the compression stroke.

During the compression stroke wherein piston 15 is moving upward as viewed in FIG. 5 the piston 15 compresses gas in the upper portion of cylinder 5, such that the compressed gas acts uniformly on the upper surface of the piston ring 25 (FIG. 5) forcing the piston ring 25 against the bottom annular surface 22 in upper groove 18, such that there is a clearance space provided between the top or upper surface of piston ring 25 and the top surface 21 of ring groove 18 to provide a direct flow path to the compressed gas to the clearance space between the outer cylindrical wall surface 23 of groove 18 and the inner cylindrical peripheral surface of piston ring 25, to thereby direct the compressed gas via pressure relief grooves 64 to the clearance space provided between the cylinder wall of the cylinder 5 and the outer peripheral surface of piston 15. Then the compressed gas flows downwardly between the piston 15 and the cylinder wall 5 past the bull ring 31 downwardly towards the pressure relief groove 64' of piston rings 25'. Bull ring 31 being non-expansible is not a sealing member and permits the flow of pressurized gas thereby. Where it is felt necessary, pressure relief groove would be provided in the bull ring to relieve pressure built up behind the inner periphery of the bull ring. Thence the compressed gas acts on the upper surface of piston ring 25' (FIG. 5) forcing the piston ring 25' against the bottom surface 22 in the lower groove 19 thereby sealing the passage of gas between the bottom planar surface of piston ring 25' and the bottom annular surface 22 of groove 19. The compressed gas flows through the passageway provided by the pressure relief groove 64' into the clearance space provided by the bottom surface 29 of ring groove 19 and the inner peripheral surface of the piston ring 25', which is the sum total of the pairs of rearwardly disposed arcuate surfaces 60 of arcuate segment 32 and the pairs of rearwardly disposed arcuate surfaces 38 of wedging segment 34, to exert a resulting radial outward pressure on piston ring 25' to effectively seal off the upper portion of cylinder 5 providing the desired gas tight seal during the upward compression stroke. In the same manner as in the original embodiment, the upper piston ring 25 in groove 18 is substantially relieved of any pressure and the outer peripheral surface of the piston ring 25 maintains only a sliding contact surface with the cylinder wall without any substantial wear since the clearance space between the bottom cylindrical surface of groove 18 and the inner rearwardly disposed inner peripheral surface of piston ring 25 would be dissipated by a pressure relief groove 64 such that only the biasing means 40 maintains an effective pressure on the piston ring 25.

During the downward compression stroke of piston 15 it is only the upper piston ring 25 which provides an effective seal against the compressed gases since piston pressure relief groove 64 is facing downwardly such as to provide a passageway for the compressed gases from the clearance space between piston 15 and the cylinder wall 5 to the clearance space between the cylindrical bottom surface of piston groove 18 and the inner peripheral surface of piston ring 25 to effectively provide an outward pressure against all ring segments of piston ring 25 to effectively seat the outer peripheral surface of piston ring 25 against the cylinder wall of cylinder 5.

Having described a preferred embodiment of this invention it is to be realized that variations therein may be made without departing from the broad spirit and scope of this invention. Accordingly it is respectfully requested that this invention be interpreted as broadly as possible and be limited only by the prior art.

What is claimed is:

1. In a sealing ring construction, an expansible sealing ring composed of cooperating ring segments having an inner peripheral cylindrical surface and an outer peripheral surface adapted to expand into contact with a cylindrical surface to be sealed, resilient means mounted on said inner peripheral surface of said ring adapted to yieldingly urge said ring segments outward to move all of said ring segments toward fully expanded position, radial grooves in said ring segments extending from said outer peripheral surface to said inner peripheral surface.

2. A piston ring assembly comprising a plurality of cooperating ring segments providing in all expanded working positions to which they attain by reason of wear a completely annular peripheral surface wherein said segments expand into gapless sealing contact with a cylindrical surface to be sealed, certain of said segments being wedge-shaped and cooperating with alternate chordal segments, resilient means for urging said wedge-shaped segments radially outwardly to move all of said segments to expanded position to compensate for wear and to maintain the sealing contact, said segments having planar top surfaces, and certain of said segments having grooves extending radially through said corresponding top surfaces.

3. In a sealing ring construction, an expansible sealing ring composed of cooperating ring segments which are cooperative to provide a gapless sealing surface engageable with a cylindrical surface to be sealed, said segments include arcuate segments and intermediate wedge segments, said wedge segments having curved inner surfaces cooperative with curved inner surfaces on said arcuate segments to define an inner periphery, said wedge segments having curved outer surfaces cooperative with curved outer surfaces on said arcuate segments to define an outer periphery, said arcuate segments and said wedge segments have top surfaces that are coplanar, and grooves in certain of said ring segments extending radially therethrough along said top surface from said outer periphery to said inner periphery.

References Cited in the file of this patent

UNITED STATES PATENTS

| | | |
|---|---|---|
| 1,984,409 | Godron | Dec. 18, 1934 |
| 1,994,491 | Towell | Mar. 19, 1935 |
| 2,177,110 | Hopple | Oct. 24, 1939 |
| 2,652,298 | Estey | Sept. 15, 1953 |
| 2,696,414 | Green | Dec. 7, 1954 |
| 2,768,037 | Payne | Oct. 23, 1956 |
| 2,802,709 | Heinze | Aug. 13, 1957 |
| 2,860,018 | Doperalski et al. | Nov. 11, 1958 |
| 2,895,774 | Doperalski | July 21, 1959 |
| 2,925,306 | Doperalski | Feb. 16, 1960 |